United States Patent
Kitaoka et al.

(10) Patent No.: US 7,484,893 B2
(45) Date of Patent: Feb. 3, 2009

(54) LUBRICATING MECHANISM FOR A TRANSFER

(75) Inventors: Shinji Kitaoka, Toukai (JP); Yukio Ueda, Toyoake (JP); Satoshi Munakata, Nishikamo-gun (JP)

(73) Assignees: Aisin Al Co., Ltd., Nishio-Shi, Aishi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 334 days.

(21) Appl. No.: 11/432,498

(22) Filed: May 12, 2006

(65) Prior Publication Data

US 2006/0257062 A1 Nov. 16, 2006

(30) Foreign Application Priority Data

May 13, 2005 (JP) ............................. 2005-141439

(51) Int. Cl.
 *F16C 33/66* (2006.01)
(52) U.S. Cl. ....................................... 384/473; 384/474
(58) Field of Classification Search ................. 384/474, 384/473, 462; 74/467
See application file for complete search history.

(56) References Cited

U.S. PATENT DOCUMENTS

| | | | | | |
|---|---|---|---|---|---|
| 2,712,967 | A | * | 7/1955 | Sutton | 384/473 |
| 3,276,827 | A | * | 10/1966 | Diver et al. | 384/467 |
| 4,453,784 | A | * | 6/1984 | Kildea et al. | 384/472 |
| 4,468,066 | A | * | 8/1984 | Alcorta et al. | 384/462 |
| 6,474,444 | B1 | * | 11/2002 | Mochizuki | 384/462 |

FOREIGN PATENT DOCUMENTS

JP 09-133202 5/1997

* cited by examiner

*Primary Examiner*—Thomas R Hannon
(74) *Attorney, Agent, or Firm*—Rooney Ingersoll & Rooney PC

(57) ABSTRACT

A lubricating mechanism includes: a rotational shaft; a casing housing a rear-end of the rotational shaft; a bearing between the rotational shaft and the casing; and an oil seal between the casing and one of the rotational shaft and a member rotatable with the rotational shaft in a space behind the bearing. The rotational shaft includes: a first oil passage extending from a front of the bearing towards the bearing; a second oil passage extending radially under the bearing, one side thereof communicating with the first oil passage and the other side thereof opening at a periphery of the rotational shaft; and a third oil passage extending between the periphery of the rotational shaft and an inner periphery of the bearing, one side thereof communicating with the other side of the second oil passage and the other side thereof communicating with the space.

13 Claims, 2 Drawing Sheets

LUBRICATING MECHANISM FOR A TRANSFER

CROSS REFERENCE TO RELATED APPLICATIONS

This application is based on and claims priority under 35 U.S.C. §119 with respect to Japanese Patent Application 2005-141439, filed on May 13, 2005, the entire content of which is incorporated herein by reference.

FIELD OF THE INVENTION

This invention generally relates to a lubricating mechanism. More specifically, this invention pertains to a lubricating mechanism for a transfer applicable for a vehicle.

BACKGROUND

JP1997(09)-133202 (FIG. 1, paragraph 0013) suggests a lubricating mechanism for a transfer. A casing houses, therein, the transfer, the lubricating mechanism and so on. In response to rotation of a chain, or of a sprocket, which contributes to power distribution, a lubricant is agitated and adhered to an inner surface of the casing. The adhered lubricant runs down on the inner surface of the casing and is partially introduced, through an oil groove formed at a rear case of the casing, to a space behind a bearing, i.e., to a clearance between a bearing and an oil seal. Accordingly, the lubricating mechanism can lubricate the bearing and the oil seal.

FIG. 3 is a partially cross sectional view for explaining a lubricating mechanism for a transfer associated with the conventional work.

With reference to FIG. 3, the transfer associated with the conventional work includes: a rotational shaft 11; a casing 12 housing the rotational shaft 11 and so on therein; a bearing 15 interposed between the rotational shaft 11 and the casing 12 and freely rotatably supporting the rotational shaft 11; an oil seal 14 provided between the casing 12 and an output member 18 in a space that is inside the casing 12 and behind (the right side in FIG. 3) the bearing 15; a sprocket 16 fitted on the rotational shaft 11 ahead of (the left side in FIG. 3) the bearing 15 and contributing in power distribution; the output member 18 spline-engaged with the rotational shaft 11 behind the bearing 15 and contributing in power distribution; and a washer 17 interposed between the sprocket 16 and the bearing 15. The bearing 15 is fitted at its inner race 15a on the rotational shaft 11, while an outer race 15b of the bearing 15 is provided at a radially extending wall of the casing 12.

The lubricating mechanism for a transfer associated with the prior art illustrated in FIG. 3, especially the lubricating mechanism by which a lubricant is guided and introduced to the oil seal 14, includes: an axial oil passage 11a formed inside the rotational shaft 11 so as to extend axially from a front side of the bearing 15 towards the bearing 15; a radial oil passage 11b formed inside the rotational shaft 11 so as to extend radially ahead of the bearing 15, one side of the radial oil passage 11b communicating with the axial oil passage 11a and the other side thereof opening at an outer peripheral surface of the rotational shaft 11 ahead of the bearing 15; a sprocket inner peripheral side oil passage 11c provided so as to extend between the outer peripheral surface of the rotational shaft 11 and an inner peripheral surface of the sprocket 16, one side of the sprocket inner peripheral side oil passage 11c communicating with the other opening side of the radial oil passage 11b and the other side of the sprocket inner peripheral side oil passage 11c communicating with a clearance between the sprocket 16 and the washer 17; and an oil receiver 13 through which a front space 10a, which is defined above (an upper side in FIG. 3) the washer 17, is connected to a rear space 10b.

According to the lubricating mechanism illustrated in FIG. 3, a lubricant, which is conveyed to the sprocket inner peripheral side oil passage 11c through the axial oil passage 11a and the radial oil passage 11b, is subjected with a centrifugal force in response to rotation of the washer 17 and scatters radially outwardly through a clearance between the sprocket 16 and the washer 17. The oil receiver 13 then receives the scattered lubricant. The lubricant received by the oil receiver 13 runs down on an inner surface of the casing 12 and is supplied to the oil seal 14.

According to the lubricating mechanism illustrated in JP1997(09)-133202 or the lubricating mechanism illustrated in FIG. 3, a lubricant is supplied to the oil seal indirectly, i.e., through the oil groove or the oil receiver which is provided at a radially distant from the rotational shaft. Further, because each lubricating mechanism requires the oil groove or the oil receiver, the structure of the lubricating mechanism may become complicated.

The present invention has been made in view of the above circumstances, and provides a lubricating mechanism, which is configured with a simple and highly robust structure and can supply lubricant directly to a lubrication required portion, such as an oil seal, with high reliability.

SUMMARY OF THE INVENTION

According to an aspect of the present invention, a lubricating mechanism includes: a rotational shaft; a casing which houses, therein, at least a rear end portion of the rotational shaft; a bearing interposed between the rotational shaft and the casing and freely rotatably supporting the rotational shaft; an oil seal positioned between the casing and at least one of the rotational shaft and a member rotatable integrally with the rotational shaft in a space that is inside the casing and at a second side of the bearing; a first oil passage formed inside the rotational shaft and extending from a first side of the bearing towards the bearing; a second oil passage formed inside the rotational shaft and extending radially under the bearing, one side of the second oil passage communicating with the first oil passage and an other side thereof opening at an outer peripheral surface of the rotational shaft; and a third oil passage extending between the outer peripheral surface of the rotational shaft and an inner peripheral surface of the bearing, one side of the third oil passage communicating with the other opening side of the second oil passage and an other side thereof communicating with the space defined at the second side of the bearing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
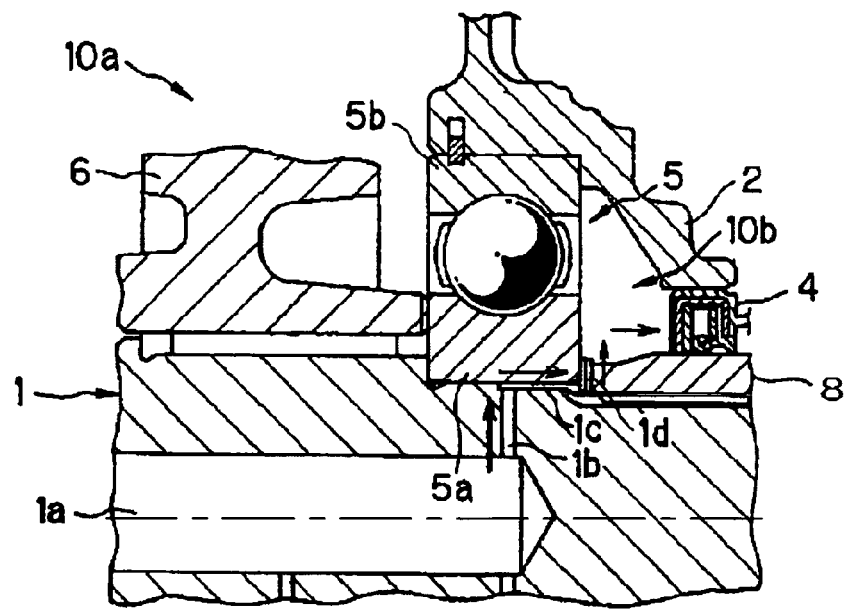
FIG. 1 is a partially cross sectional view illustrating a lubricating mechanism for a transfer according to an embodiment of the present invention.
Figure 2A:
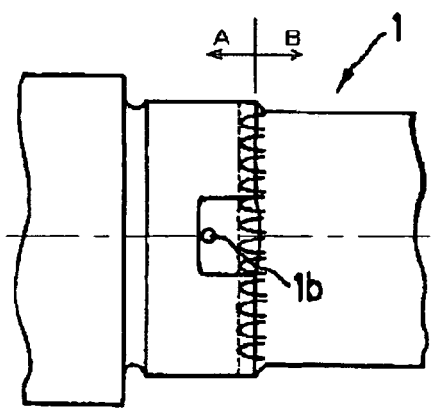
FIG. 2A is an aerial view illustrating an example of a structure of a third oil passage of the lubricating mechanism.
Figure 2B:
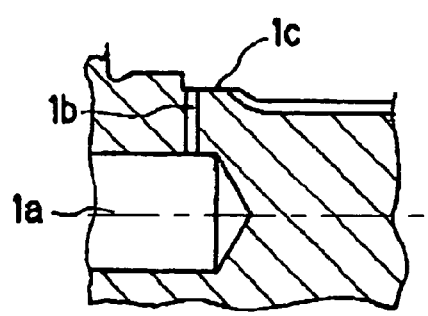
FIG. 2B is a sectional view illustrating the example of the structure of the third oil passage of the lubricating mechanism.

An embodiment of the present invention is described herein with reference to FIGS. 1, 2A and 2B.

A lubricating mechanism for a transfer according to the embodiment of the present invention includes: a rotational shaft 1; a casing 2 which houses, therein, at least a rear end portion of the rotational shaft 1; a bearing 5 interposed between the rotational shaft 1 and the casing 2 and freely rotatably supporting the rotational shaft 1; a sprocket 6 fitted on the rotational shaft 1 ahead of (the left side in FIG. 1) the bearing 5; an oil seal 4 positioned between the casing 2 and at least one of the rotational shaft 1 and a member (an output member 8) rotatable integrally with the rotational shaft 1 in a space that is inside the casing 2 and behind (at a second side of, a right side in FIG. 1) the bearing 5; a first oil passage 1a formed inside the rotational shaft 1 so as to extend in an axial direction of the rotational shaft 1 from a front side (a first side of, a left side in FIG. 1) of the bearing 5 towards the bearing 5; a second oil passage 1b formed inside the rotational shaft 1 so as to extend in a radial direction of the rotational shaft 1 under or at the bearing 5, one end or side of the second oil passage 1b communicating with the first oil passage 1a and the other end or side thereof opening on an outer peripheral surface of the rotational shaft 1; and a third oil passage 1c extending between the outer peripheral surface of the rotational shaft 1 and an inner peripheral surface of the bearing 5, one end or side of the third oil passage 1c communicating with the other opening end or side of the second oil passage 1b and the other end or side thereof communicating with a space 10b behind the bearing 5. The bearing 5 includes an inner race 5a and an outer race 5b.

Inside the casing 2, a space 10a, which is ahead of (at the first side of) the bearing 5, is separated from the space 10b behind the bearing 5 by the rotational shaft 1, the bearing 5 and a radially extending wall of the casing 2.

The output member 8 is spline-engaged with a rear end portion of the rotational shaft 1. Through a fourth oil passage 1d, i.e., through a clearance between a rear surface of the bearing 5 and a spline-engaged portion between the rotational shaft 1 and the output member 8, the third oil passage 1c can communicate with the space 10b behind the bearing 5.

As for a diameter of the rotational shaft 1, its diameter (a first diameter) immediately under or at the bearing 5 is greater than its diameter (a second diameter) behind the bearing 5. The second oil passage 1b is formed at a portion immediately under the bearing 5, a diameter of which is a part of the first diameter and is greater than the second diameter behind the bearing 5. The diameter (the first diameter) is denoted with an alphabet reference A in FIG. 2A. The second oil passage 1b is not formed at a portion of the rotational shaft 1 behind the bearing 5, a diameter of which is a part of the second diameter and is smaller than the first diameter. The diameter (the second diameter) is denoted with an alphabet reference B in FIG. 2A.

Next, an operation of the lubricating mechanism for the transfer according to the embodiment of the present invention is described below.

Continuously with reference to FIGS. 1, 2A and 2B, when the rotational shaft 1 rotates, a lubricant is subjected with a centrifugal force and is conveyed to the third oil passage 1c through the first oil passage 1a and the second oil passage 1b. The lubricant then is dispersed or scattered towards the space 10b behind the bearing 5 through the fourth oil passage 1d defined at the rear surface of the bearing 5, and a part of the scattered lubricant lubricates the oil seal 4.

As described above, according to the embodiment of the present invention described above, the lubricant in the rotational shaft 1 can be supplied directly to the oil seal 4, which is included in a portion that would be better lubricated or should be lubricated.

Still further, because the second oil passage 1b (a radial oil passage) is provided at a portion of the rotational shaft 1, the portion which is positioned immediately under or at the bearing 5 and possesses a large robustness allowance, while robustness or strength of the rotational shaft 1 is maintained at an appropriate level, the above-described direct lubricating passage is achieved.

Figure 3:
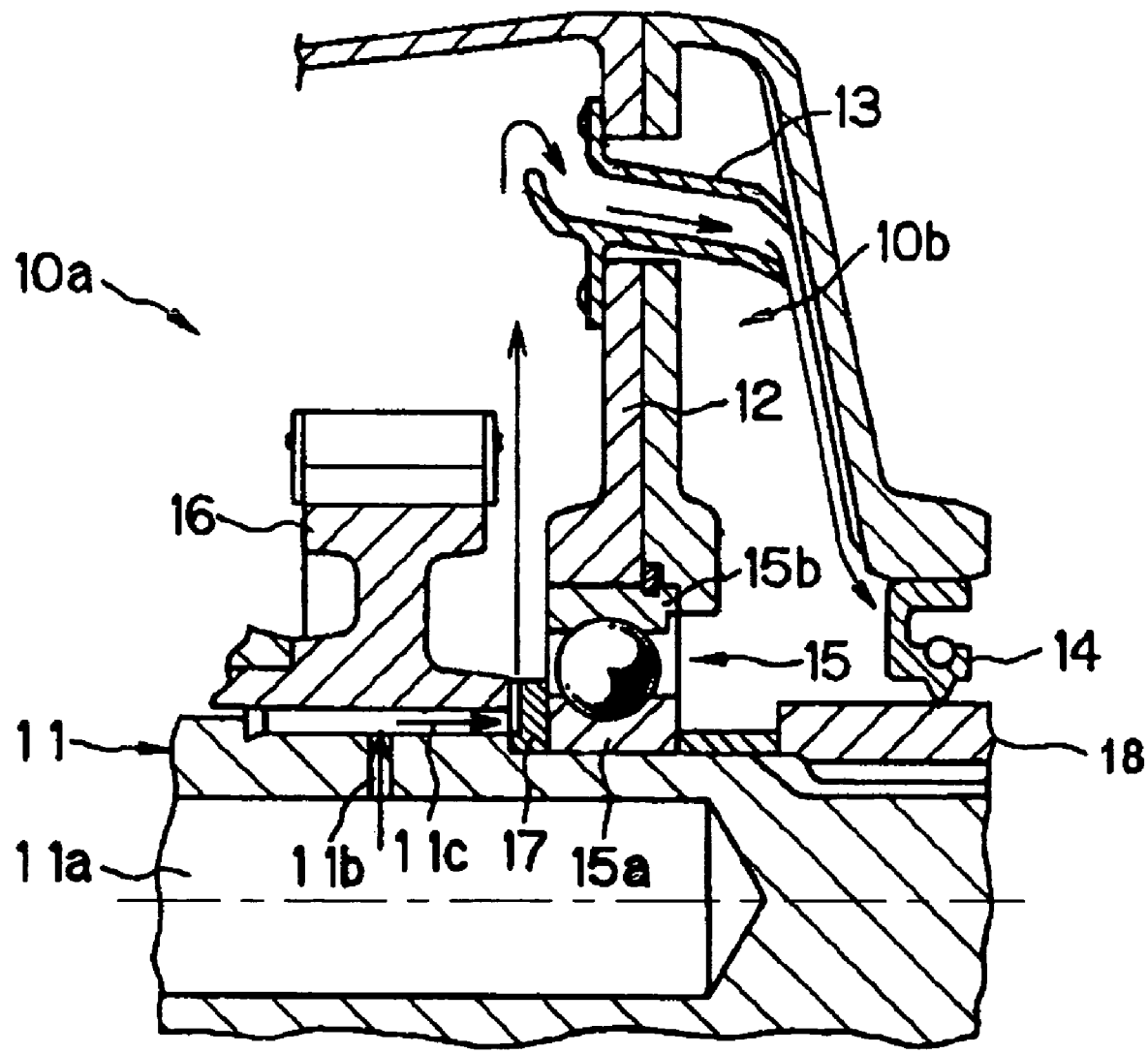
FIG. 3 is a partially cross sectional view for explaining a conventional lubricating mechanism for a transfer.

Still further, the oil receiver 13 and the washer 17, which are included in the lubricating mechanism associated with the conventional work and are illustrated in FIG. 3, are omitted from the lubricating mechanism according to the embodiment of the present invention.

Still further, the oil seal 4 is interposed between the casing 2 and the output shaft 8 which is fitted on the output shaft 1. Alternatively, the oil seal 4 can be interposed between the casing 2 and a member rotatable integrally with the rotational shaft 1, which is a flange mounted on the rotational shaft 1 as a non-limiting example. Still alternatively, the oil seal 4 can be interposed between the casing 2 and the rotational shaft 1.

As described above, a lubricant can be supplied directly to a lubrication required portion, such as an oil seal whish is positioned behind a bearing and is configured to seal a clearance between a rear end of a transmission case (an extension housing) and a rotational shaft or a rear end of a rotatable member, through first and second oil passages defined in the rotational shaft and further through a third oil passage defined between the rotational shaft and the bearing. Therefore, lubrication for the oil seal and reliability in a sealing performance of the oil seal can be enhanced in virtue of a simple structure.

Further, in a general way, because the second oil passage is bored in the rotational shaft under or at the bearing, at which a diameter of the rotational shaft is greater than a diameter of the rotational shaft behind the bearing, while a robustness of the rotational shaft is not deteriorated, the lubricant can be supplied directly to the lubrication required portion.

Still further, the third oil passage preferably can be a port providing an access to the space behind the bearing. The third oil passage can be formed at a spline-engaged portion between the rotational shaft and the member, which is spline-engaged with the rotational shaft and is rotatable integrally with the rotational shaft. A freedom of the structure of the third oil passage is hence not limited.

Still further, the lubricating mechanism can include an output member spline-engaged with the rotational shaft. The third oil passage can communicate with the space behind the bearing through a clearance between a rear surface of the bearing and the spline-engaged portion between the rotational shaft and the output member.

Still further, the lubricating mechanism can further include a fourth oil passage defined so as to extend in a radical direction of the rotational shaft between a rear surface of the bearing and at least one of the rotational shaft and a member rotatable integrally with the rotational shaft. One end or side of the fourth oil passage communicates with the third oil passage, and the other end or side thereof opens to the space behind the bearing.

Still further, as for a diameter of the rotational shaft 1, its diameter (a first diameter) of a portion under or at the bearing is greater than its diameter (a second diameter) of portion behind the bearing. The second oil passage is formed at the portion under or at the bearing, a diameter of which is a part of the first diameter and is greater than the second diameter behind the bearing. In such circumstances, the oil passage (a radial directional bore) is provided at a portion of the rotational shaft, the portion which is positioned directly under or at the bearing and possesses a large robustness allowance. As described above, because the radial direction bore can be defined at a portion of which diameter is large, a rotational shaft, an entire diameter of which is small, can be applicable.

Still further, a front surface of the bearing can be directly in contact with the rotational shaft.

Still further, a casing of the lubricating mechanism for a transfer includes a transmission case, an extension housing, an end cover and so on.

Still further, in a vehicle having a transmission which controls, by several gear ratios, a driving power of a driving power source such as an engine or a motor; and a transfer which distributes driving power outputted from the transmission to front and/or rear wheels, the lubricating mechanism can be employed as a lubricating mechanism for the transfer. The vehicle can be for example a full-time 4WD, a part-time 4WD and so on. Especially, the lubricating mechanism can be employed to lubricate an oil seal provided between a rear end of a case (housing) and a rear end of a rotational shaft or a member rotatable integrally with the rotational shaft.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A lubricating mechanism comprising;
    a rotational shaft;
    a casing which houses, therein, at least a rear end portion of the rotational shaft;
    a bearing interposed between the rotational shaft and the casing and freely rotatably supporting the rotational shaft;
    an oil seal positioned between the casing and at least one of the rotational shaft and a member rotatable integrally with the rotational shaft in a space that is inside the casing and at a second side of the bearing;
    a first oil passage formed inside the rotational shaft and extending from a first side of the bearing towards the bearing;
    a second oil passage formed inside the rotational shaft and extending radially under the bearing, one side of the second oil passage communicating with the first oil passage and an other side thereof opening at an outer peripheral surface of the rotational shaft; and
    a third oil passage extending between the outer peripheral surface of the rotational shaft and an inner peripheral surface of the bearing, one side of the third oil passage communicating with the other opening side of the second oil passage and an other side thereof communicating with the space defined at the second side of the bearing.

2. A lubricating mechanism according to claim 1, wherein the third oil passage is a port providing an access to the space defined at the second side of the bearing.

3. A lubricating mechanism according to claim 1, further comprising:
    an output member spline-engaged with the rotational shaft,
    wherein the third oil passage communicates with the space defined at the second side of the bearing through a clearance between a rear surface of the bearing and a spline-engaged portion between the rotational shaft and the output member.

4. A lubricating mechanism according to claim 1, further comprising:
    a fourth oil passage defined so as to extend radially between a rear surface of the bearing and the at least one of the rotational shaft and the member rotatable integrally with the rotational shaft, one side of the fourth oil passage communicating with the third oil passage and an other side thereof opening to the space at the second side of the bearing.

5. A lubricating mechanism according to claim 1, wherein the rotational shaft possesses a first diameter under the bearing and a second diameter defined at the second side of the bearing, and the first diameter is greater than the second diameter,
    wherein the second oil passage is defined at a portion corresponding to the first diameter of the rotational shaft.

6. A lubricating mechanism according to claim 1, wherein the first side of the bearing is a front side of the bearing, and the second side of the bearing is a rear side of the bearing.

7. A lubricating mechanism according to claim 1, wherein the first oil passage extends in an axial direction of the rotational shaft.

8. A lubricating mechanism for a transfer, the lubricating mechanism by which lubrication is implemented through an inside of a shaft, comprising;
    a rotational shaft;
    a casing which houses, therein, at least a rear-end portion of the rotational shaft;
    a bearing interposed between the rotational shaft and the casing and freely rotatably supporting the rotational shaft;
    an oil seal positioned between the casing and at least one of the rotational shaft and a member rotatable integrally with the rotational shaft in a space that is inside the casing and behind the bearing;
    a first oil passage formed inside the rotational shaft and extending from a front side of the bearing towards the bearing;
    a second oil passage formed inside the rotational shaft and extending radially under the bearing, one side of the second oil passage communicating with the first oil passage and an other side thereof opening at an outer peripheral surface of the rotational shaft; and
    a third oil passage extending between the outer peripheral surface of the rotational shaft and an inner peripheral surface of the bearing, one side of the third oil passage communicating with the other opening side of the second oil passage and an other side thereof communicating with the space behind the bearing.

9. A lubricating mechanism for a transfer according to claim 8, wherein the third oil passage is a port providing an access to the space defined behind the bearing.

10. A lubricating mechanism for a transfer according to claim 8, further comprising:
an output member spline-engaged with the rotational shaft, wherein the third oil passage communicates with the space behind the bearing through a clearance between a rear surface of the bearing and a spline-engaged portion between the rotational shaft and the output member.

11. A lubricating mechanism for a transfer according to claim 8, further comprising:
a fourth oil passage defined so as to extend radially between a rear surface of the bearing and the at least one of the rotational shaft and the member rotatable integrally with the rotational shaft, one side of the fourth oil passage communicating with the third oil passage and an other side thereof opening to the space behind the bearing.

12. A lubricating mechanism for a transfer according to claim 8, wherein the rotational shaft possesses a first diameter under the bearing and a second diameter defined behind the bearing, and the first diameter is greater than a second diameter,
wherein, the second oil passage is defined at a position corresponding to the first diameter of the rotational shaft.

13. A lubricating mechanism for a transfer according to claim 8, wherein the first oil passage extends in an axial direction of the rotational shaft.

* * * * *